United States Patent
Lee et al.

(10) Patent No.: US 8,587,692 B2
(45) Date of Patent: Nov. 19, 2013

(54) METHOD AND APPARATUS FOR INCREASING DYNAMIC RANGE OF IMAGE BY USING ELECTRONIC SHUTTER

(75) Inventors: Tae-ho Lee, Suwon-si (KR); Takafumi Usui, Seoul (KR)

(73) Assignee: Samsung Electronics Co., Ltd (KR)

(*) Notice: Subject to any disclaimer, the term of this patent is extended or adjusted under 35 U.S.C. 154(b) by 354 days.

(21) Appl. No.: 12/872,535

(22) Filed: Aug. 31, 2010

(65) Prior Publication Data

US 2011/0050946 A1 Mar. 3, 2011

(30) Foreign Application Priority Data

Aug. 31, 2009 (KR) .................. 10-2009-0081486

(51) Int. Cl.
*H04N 5/235* (2006.01)
*G03B 7/00* (2006.01)

(52) U.S. Cl.
USPC ....................... 348/229.1; 248/362

(58) Field of Classification Search
USPC .................. 348/222.1, 362, 229.1
See application file for complete search history.

(56) References Cited

U.S. PATENT DOCUMENTS

| | | | |
|---|---|---|---|
| 6,542,194 B1 | 4/2003 | Juen | |
| 8,218,068 B2* | 7/2012 | Deever et al. | 348/362 |
| 2005/0110894 A1 | 5/2005 | Hiramatsu | |
| 2006/0087573 A1 | 4/2006 | Harada | |
| 2006/0109373 A1 | 5/2006 | Kurane | |
| 2008/0218614 A1 | 9/2008 | Joshi et al. | |
| 2008/0252768 A1 | 10/2008 | Suzuki | |
| 2008/0284873 A1* | 11/2008 | Miyanari | 348/229.1 |
| 2009/0251591 A1* | 10/2009 | Whitham | 348/362 |
| 2009/0295971 A1* | 12/2009 | Tsuchiya | 348/311 |
| 2011/0141331 A1* | 6/2011 | Lee et al. | 348/297 |
| 2011/0149129 A1* | 6/2011 | Kim et al. | 348/296 |
| 2012/0147234 A1* | 6/2012 | Asukabe | 348/296 |

FOREIGN PATENT DOCUMENTS

| | | |
|---|---|---|
| EP | 0 862 321 | 9/1998 |
| EP | 0 936 809 | 8/1999 |
| EP | 1 729 503 | 12/2006 |
| EP | 1 898 635 | 3/2008 |
| EP | 1 995 950 | 11/2008 |
| EP | 2 007 129 | 12/2008 |
| JP | 11-234572 | 8/1999 |
| JP | 2005-159418 | 6/2005 |
| JP | 2006-101492 | 4/2006 |
| KR | 1020080030952 | 4/2008 |

* cited by examiner

*Primary Examiner* — Tuan Ho
*Assistant Examiner* — Shahbaz Nazrul
(74) *Attorney, Agent, or Firm* — The Farrell Law Firm, P.C.

(57) ABSTRACT

A method for increasing a dynamic range of an image by using an electronic shutter of a camera, the method including initiating exposure of an image sensor by moving a mechanical front curtain included in the camera; moving an electronic front curtain with respect to at least one pixel of the image sensor according to a control pulse signal of the electronic shutter; and blocking the exposure of the image sensor by moving a mechanical rear curtain included in the camera.

20 Claims, 8 Drawing Sheets

METHOD AND APPARATUS FOR INCREASING DYNAMIC RANGE OF IMAGE BY USING ELECTRONIC SHUTTER

PRIORITY

This application claims priority to Korean Patent Application No. 10-2009-0081486, filed on Aug. 31, 2009, in the Korean Intellectual Property Office, the disclosure of which is incorporated herein in its entirety by reference.

BACKGROUND OF THE INVENTION

1. Field of the Invention

The present invention relates to a method and apparatus for acquiring an image with an increased dynamic range by using an electronic shutter of a camera.

2. Description of the Related Art

High Dynamic Range (HDR) imaging is a technology for improving image quality by increasing a dynamic range of an image output from an image sensor of a camera device. If a bright area and a dark area are included in a single image, there is a limitation in obtaining better image quality due to a limited dynamic range of the image sensor.

An imaging device acquires an image by converting light gathered by a sensor into an electrical signal. Although the imaging device photographs a real scene, an image acquired by the imaging device may be darker or brighter than the actual scene according to a light-gathering time (exposure time). That is, the longer the imaging device is exposed to light, the brighter the image obtained. Accordingly, a light-gathering time in a dark area seems to be short, and a light-gathering time in a bright area, that is, where light is saturated, seems to be long. In particular, since an 8-bit digital image has only grayscale levels between 0 and 255, a dynamic range of the digital image is limited.

Accordingly, HDR imaging for increasing a dynamic range by synthesizing a plurality of images with different exposure amounts is necessary.

SUMMARY OF THE INVENTION

The present invention provides a method and apparatus for generating a High Dynamic Range (HDR) image by generating a plurality of images with different exposure amounts, such as a long exposure image and a short exposure image, with only one shutter operation by additionally locating simple hardware for controlling the operation of an electronic shutter between a mechanical front curtain and a mechanical rear curtain and synthesizing the plurality of images by using a Digital Signal Processor (DSP).

According to an aspect of the present invention, there is provided a method of increasing a dynamic range of an image by using an electronic shutter of a camera, the method including initiating exposure of an image sensor by moving a mechanical front curtain included in the camera; moving an electronic front curtain with respect to at least one pixel of the image sensor according to a control pulse signal of the electronic shutter; and blocking the exposure of the image sensor by moving a mechanical rear curtain included in the camera.

The method may further include setting a line-based or pixel-based exposure initiating time of the image sensor to be different from an exposure initiating time due to the mechanical front curtain.

After the blocking of the exposure of the image sensor by moving the mechanical rear curtain, the method may further include acquiring a long exposure image by using the mechanical front curtain and a short exposure image by using the electronic front curtain.

The method may further include generating an HDR image with an increased dynamic range by synthesizing the acquired long exposure image and the acquired short exposure image.

The method may further include moving the electronic front curtain at least one time with respect to at least one pixel of the image sensor according to the control pulse signal of the electronic shutter.

After the blocking of the exposure of the image sensor by moving the mechanical rear curtain, the method may further include acquiring a long exposure image by using the mechanical front curtain and acquiring a short exposure image by using the electronic front curtain.

According to another aspect of the present invention, there is provided an apparatus for increasing a dynamic range of an image by using an electronic shutter of a camera, the apparatus including a mechanical front curtain moving unit for initiating exposure of an image sensor by moving a mechanical front curtain included in the camera; an electronic front curtain moving unit for moving an electronic front curtain with respect to at least one pixel of the image sensor according to a control pulse signal of the electronic shutter; and a mechanical rear curtain moving unit for blocking the exposure of the image sensor by moving a mechanical rear curtain included in the camera.

The apparatus may further include a multi-exposure pulse signal generating unit for generating the control pulse signal so that a line-based or pixel-based exposure initiating time of the image sensor is set to be different from an exposure initiating time due to the mechanical front curtain.

The apparatus may further include a scan pattern generating unit for generating a scan pattern of the electronic shutter based on parameters, which are external factors including at least one of a position, a temperature, and a humidity of the camera, in order to generate the control pulse signal.

The apparatus may further include a multi-exposure image acquiring unit for acquiring, after the exposure of the image sensor is blocked by the mechanical rear curtain, a long exposure image by using the mechanical front curtain and a short exposure image by using the electronic front curtain.

The apparatus may further include an image synthesizing unit for generating an HDR image with an increased dynamic range by synthesizing the acquired long exposure image and the acquired short exposure image.

The apparatus may further include a multi-exposure image acquiring unit for acquiring, after the exposure of the image sensor is blocked by the mechanical rear curtain, a long exposure image by using the mechanical front curtain and a short exposure image by using the electronic front curtain.

According to another aspect of the present invention, there is provided a computer-readable recording medium having embodied thereon a program for executing the method.

BRIEF DESCRIPTION OF THE DRAWINGS

The above and other features and advantages of the present invention will become more apparent by describing in detail embodiments thereof with reference to the attached drawings in which.

DETAILED DESCRIPTION OF THE INVENTION

In order to fully understand operational advantages of the present invention and objects to be attained by embodiments of the present invention, the accompanying drawings illustrating exemplary embodiments of the present invention and details described in the following detailed description should be referred to. Like reference numerals denote like elements in the drawings. Although embodiments of the present invention are illustrated in the drawings, the drawings are not necessarily to scale, and some features may be exaggerated in order to better explain the present invention.

In the following description of the present invention, a dynamic range of an image refers to a difference between the brightest and the darkest areas of an image that may be simultaneously recorded by a display device. The dynamic range is controlled by adjusting a pixel value indicating brightness, such as luminance, of the image. As the dynamic range increases, a wider range of gradation may be obtained.

A focal-plane shutter used in a camera generally includes a front curtain and a rear curtain. Light from an object, which is incident on an image sensor such as a charge-coupled device (CCD) sensor or a complementary metal-oxide semiconductor (CMOS) sensor, is exposed to the image sensor by moving the front curtain and the rear curtain in front of the image sensor of the camera. The exposure is started by moving the front curtain, and, after a predetermined period of time, photographing of the object is ended by moving the rear curtain according to a shutter speed. Since the front curtain and the rear curtain are generally mechanical curtains, the front curtain and the rear curtain are also called a mechanical front curtain and a mechanical rear curtain, respectively.

The present invention will now be described more fully with reference to the accompanying drawings, in which embodiments of the invention are shown.

A method for acquiring a high dynamic range (HDR) image may be classified into three methods.

A first method for acquiring an HDR image is a technology for increasing a dynamic range and image quality of image data output from an image sensor by using an Image Signal Processing (ISP) algorithm. Examples of the first method may include gamma-correction and Retinex image enhancement.

A second method of acquiring an HDR image is a technology for increasing a dynamic range by obtaining images with different exposure amounts and synthesizing the images by using an ISP algorithm. In detail, the second method obtains image data by capturing two images at different shutter speeds and synthesizes and corrects the images by using an appropriate ISP algorithm.

A third method of acquiring an HDR image is a technology that obtains image data by using two pixels with different sensitivities in an image sensor. Pixel data with different sensitivities obtained during the same exposure time has the same effect as that of image data generated with different exposure amounts. The third method of acquiring the HDR image is a technology for obtaining an HDR image by synthesizing and correcting the image data generated by the two pixels, which is the preferred method of increasing a dynamic range.

Examples of a conventional method of correcting an image include a method using an ISP algorithm and a multi shutter technology. However, although the method using the ISP algorithm may effectively correct data of an image in which there is a great difference between the brightest and darkest areas, the method using the ISP algorithm has a disadvantage in that it is difficult to obtain a wide range of gradation. Also, the multi shutter technology generates and synthesizes two or more images with different exposure amounts by varying exposure times. However, the multi shutter technology has disadvantages in that a shooting time is long due to two or more shutter operations, the possibility of acquiring different images is high due to two different shutter speeds while camera shake occurs, and it is difficult to obtain good results when the images are synthesized.

Further examples of the conventional method of correcting the image include a method of generating and synthesizing images generated by pixels with different sensitivities in an image sensor. However, the method of generating and synthesizing images generated by pixels with different sensitivities has a disadvantage in that since this method generates images with the same exposure amount by using a fixed image sensor, a plurality of images with various exposure amounts may not be obtained.

Figure 1:
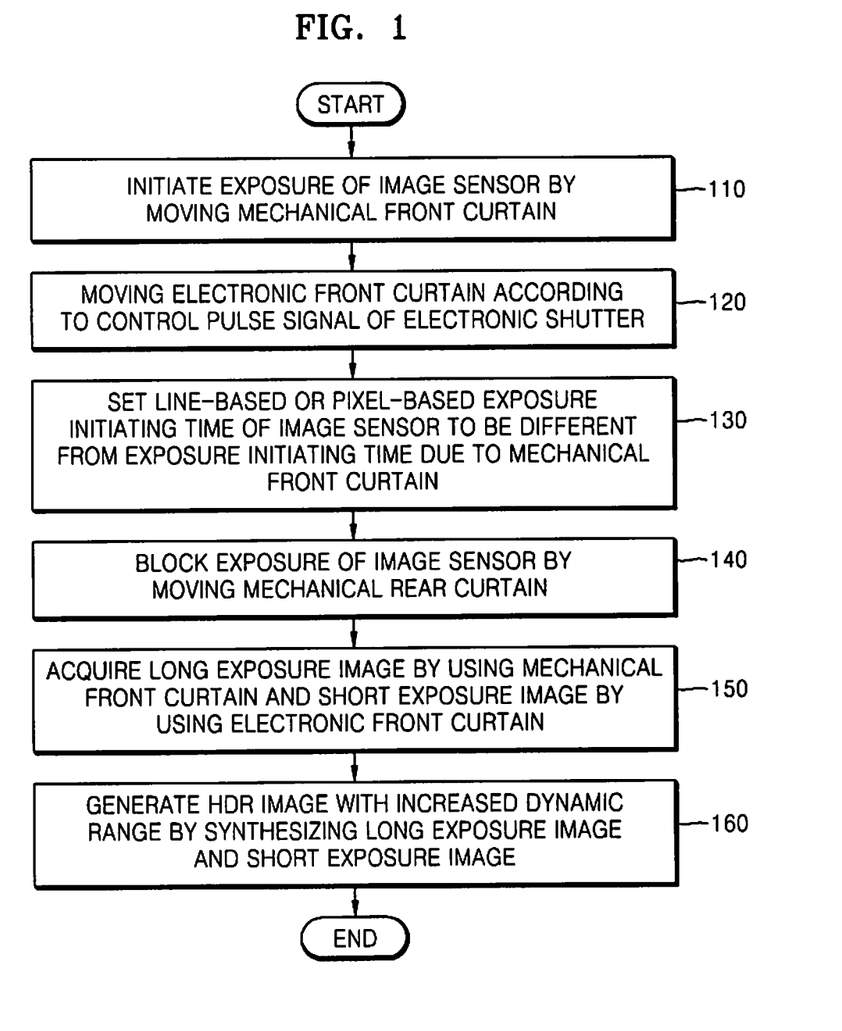
FIG. 1 is a flowchart illustrating a method of increasing a dynamic range of an image by using an electronic shutter of a camera, according to an embodiment of the present invention.

FIG. 1 is a flowchart illustrating a method of increasing a dynamic range of an image by using an electronic shutter of a camera, according to an embodiment of the present invention.

Referring to FIG. 1, the method of increasing the dynamic range of the image roughly includes initiating exposure of an image sensor by moving a mechanical front curtain included in a camera in step 110, moving an electronic front curtain with respect to at least one pixel of the image sensor according to a control pulse signal of the electronic shutter in step 120, and blocking the exposure of the image sensor by moving a mechanical rear curtain included in the camera in step 140.

When a shutter of the camera is pressed in order for a user to capture an image, a mirror located inside the camera is raised and all pixels of the image sensor are set to a global reset. In step 110, exposure of the image sensor is initiated by moving the mechanical front curtain downward.

In step 120, a control pulse signal of the electronic shutter is applied in synchronization with a short exposure whose exposure time is set by the user at the same time as when an exposure time of a long exposure is set, and the electronic front curtain is moved according to the control pulse signal of the electronic shutter. That is, during the exposure time of the long exposure performed by the mechanical front curtain and the mechanical rear curtain, the control pulse signal of the electronic shutter which indicates a starting point of the exposure time of the short exposure is applied.

In step 130, a line-based or pixel-based exposure initiating time of the image sensor due to the electronic front curtain is set to be different from an exposure initiating time due to the mechanical front curtain. That is, the control pulse signal of the electronic shutter may not be applied to all pixels but may be applied to odd lines or even lines, or to odd pixels or even pixels for the purpose of short exposure. At this time, pulses are generated nonlinearly according to speed and travel characteristics of the electronic front curtain. Accordingly, the electronic front curtain is nonlinearly moved in accordance with the speed and travel characteristics of the mechanical front curtain and the mechanical rear curtain. The speed of a mechanical shutter is not constant due to the restoring force of a spring. In detail, the speed of the mechanical shutter is relatively low at a travel starting point and relatively high at a travel ending point. Meanwhile, speed and travel characteristics of the generated pulses are determined by a micro processor (not shown) based on parameters that are external factors such as a position, a temperature, and a humidity of the camera.

Figure 9:
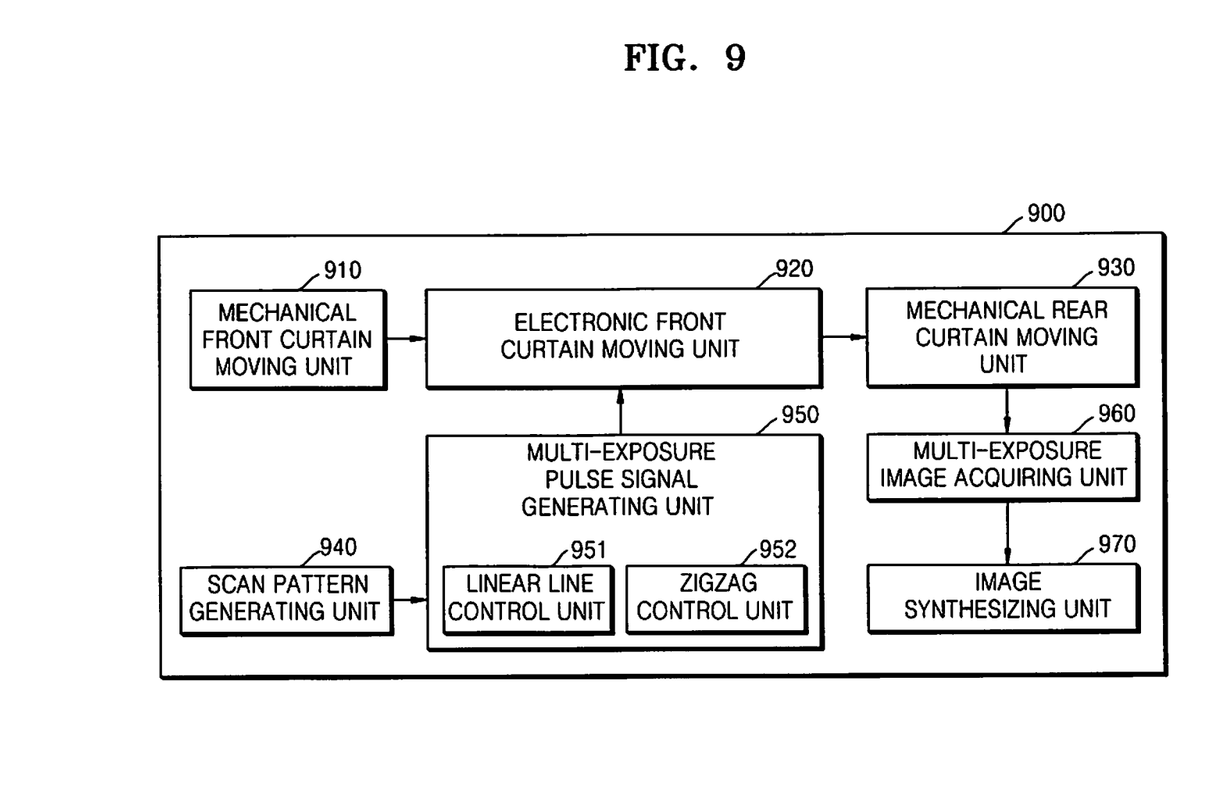
FIG. 9 is a block diagram of an apparatus for increasing a dynamic range of an image by using an electronic shutter of a camera, according to an embodiment of the present invention.

Briefly referring to FIG. 9, if a micro processor (not shown) transmits a control signal to a scan pattern generating unit 940, the scan pattern generating unit 940 detects speed and travel characteristics of the mechanical front curtain and the mechanical rear curtain, and a multi-exposure pulse signal generating unit 950 generates a control pulse according to the speed and travel characteristics and transmits the control pulse to an electronic front curtain moving unit 920.

Next, in step 140, the exposure of the image sensor is blocked by continuously moving the mechanical rear curtain vertically in synchronization with the long exposure. Accordingly, the amount of exposure of the captured image is adjusted by moving the mechanical rear curtain.

Next, in step 150, when the operation of the mechanical rear curtain is finished, a long exposure image is acquired by using the mechanical front curtain and a short exposure image is acquired by using the electronic front curtain.

For example, a long exposure image due to the mechanical front curtain may be generated by using image data of odd lines read from the image sensor, and a short exposure image due to the electronic shutter may be generated by using image data of even lines read from the image sensor.

Next, in step 160, an HDR image with an increased dynamic range is generated by synthesizing the long exposure image and the short exposure image by using an ISP algorithm.

Figure 2:
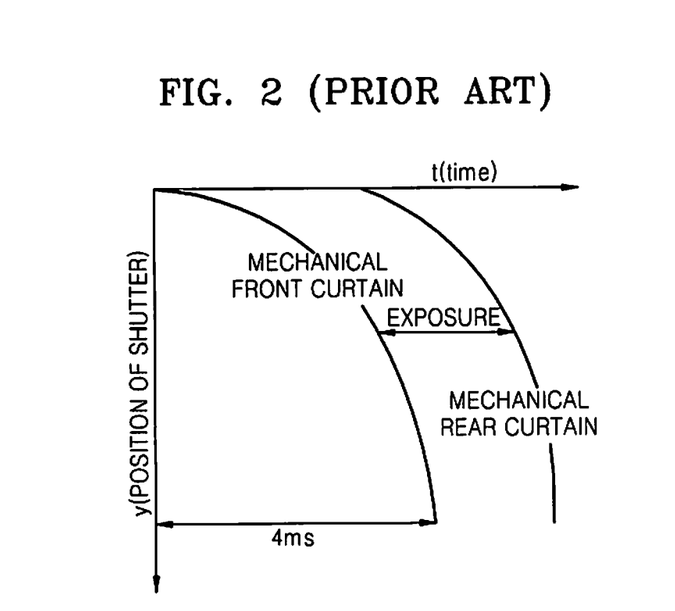
FIG. 2 is a graph illustrating speed characteristics of a conventional mechanical front curtain and a conventional mechanical rear curtain.
Figure 3:
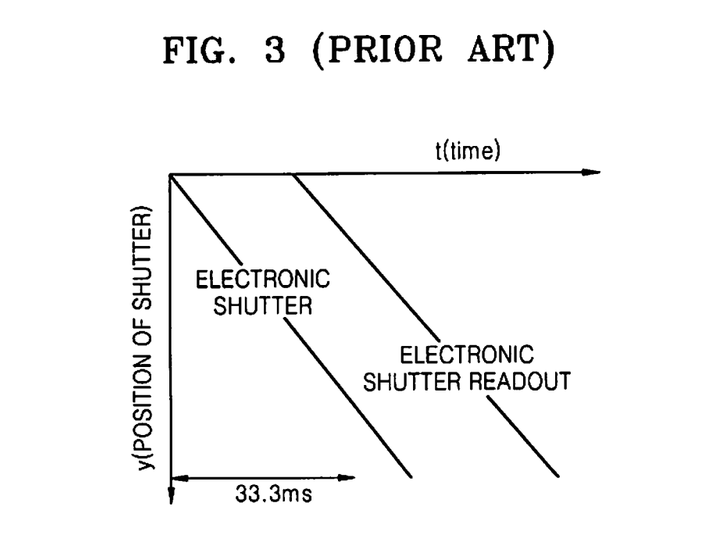
FIG. 3 is a graph illustrating speed characteristics of a conventional electronic shutter.

FIG. 2 is a graph illustrating speed characteristics of a conventional mechanical front curtain and a conventional mechanical rear curtain. FIG. 3 is a graph illustrating speed characteristics of a conventional electronic shutter.

In general, when a user presses a shutter button of a camera, a mirror portion is raised, and a mechanical front curtain and a mechanical rear curtain are moved.

Next, the amount of exposure is controlled due to a time difference between the mechanical front curtain and the mechanical rear curtain. Data is read from an image sensor, and an image is stored and then is synthesized and corrected.

Speed profiles of the conventional mechanical front curtain and the conventional mechanical rear curtain are shown in FIG. 2. The conventional mechanical front curtain and the conventional mechanical rear curtain have the same speed characteristics. Exposure control is uniformly performed on all images.

Also, referring to FIG. 3, a line-based pixel exposure time is controlled by using a readout time and the speed characteristics of the conventional electronic shutter.

However, although the electronic shutter may control the exposure time at high speed, the electronic shutter has a readout time of about 33.3 ms due to an operation time of an image sensor that reads 30 frames per second.

Accordingly, since the operation time and the readout time of the conventional electronic shutter are equal to each other, distortion occurs in a captured image and a moving image. Continuous shooting may not be performed quickly due to a time limitation.

Figure 4:
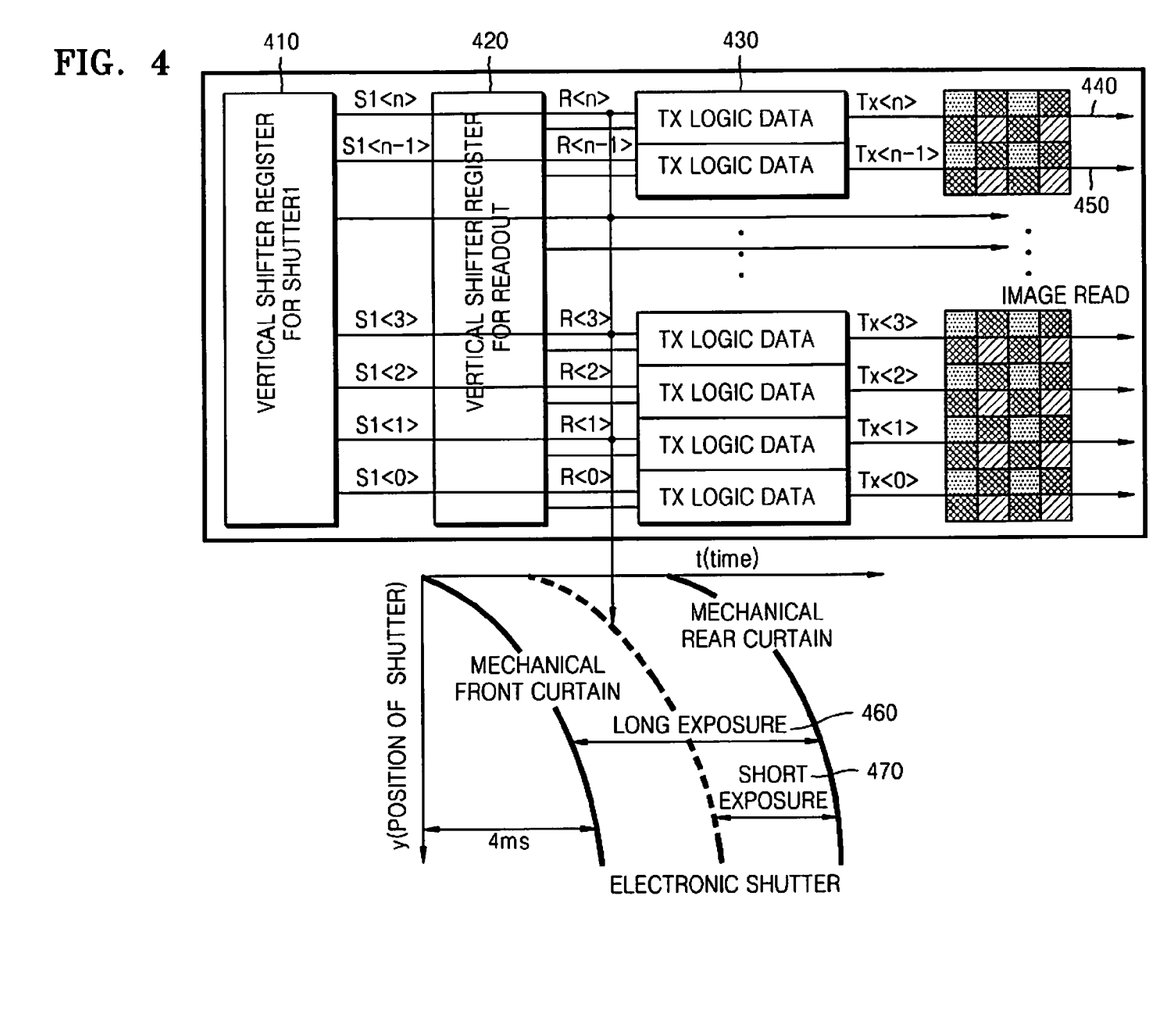
FIG. 4 is a circuit diagram of a configuration for increasing a dynamic range of an image by using an electronic shutter, according to an embodiment of the present invention, and a graph illustrating an operation of the electronic shutter.

FIG. 4 is a circuit diagram of a configuration for increasing a dynamic range of an image by using an electronic shutter, according to an embodiment of the present invention, and a graph illustrating an operation of the electronic shutter.

If the configuration includes only a mechanical front curtain and a mechanical rear curtain, only a vertical shift register for readout 420 may be necessary. However, in FIG. 4, the configuration uses an electronic front curtain and additionally includes a vertical shift register for shutter 1 410. The vertical shift register for shutter 1 410 generates a control pulse signal for acquiring a short exposure image. The vertical shift register for shutter 1 410 outputs the control pulse signal to a logic gate 430. It is noted in FIG. 4 that "S" refers to a data line for the shutter and "R" refers to a data line for readout.

Accordingly, a plurality of exposure images including odd lines 440 for acquiring a long exposure image 460 by using the mechanical front curtain and even lines 450 for acquiring a short exposure image 470 by using the electronic front curtain may be acquired even when a user performs only one shutter operation.

Figure 5:
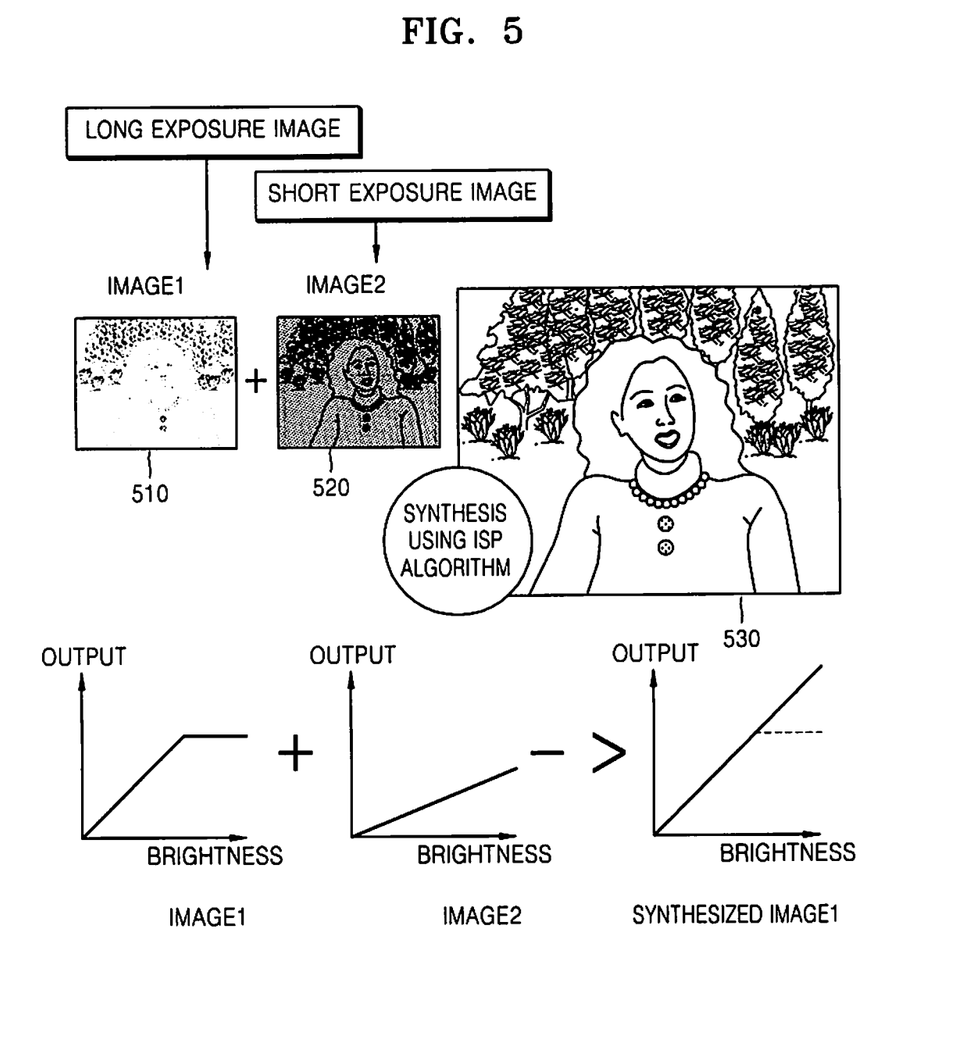
FIG. 5 illustrates a process of generating a high dynamic range (HDR) image by synthesizing a long exposure image and a short exposure image by using an Image Signal Processing (ISP) algorithm, according to an embodiment of the present invention.

FIG. 5 illustrates a process of generating a High Dynamic Range (HDR) image by synthesizing a long exposure image and a short exposure image by using an ISP algorithm, according to an embodiment of the present invention.

In FIG. 5, an HDR image 530 is generated by synthesizing and correcting a long exposure image 510 and a short exposure image 520. If a dynamic range of the long exposure image 510 and a dynamic range of the short exposure image 520 are synthesized, a total dynamic range is increased, to obtain the HDR image 530. That is, the HDR image 530 obtained by the synthesis has brightness and output which are linearly increased.

Figure 6:
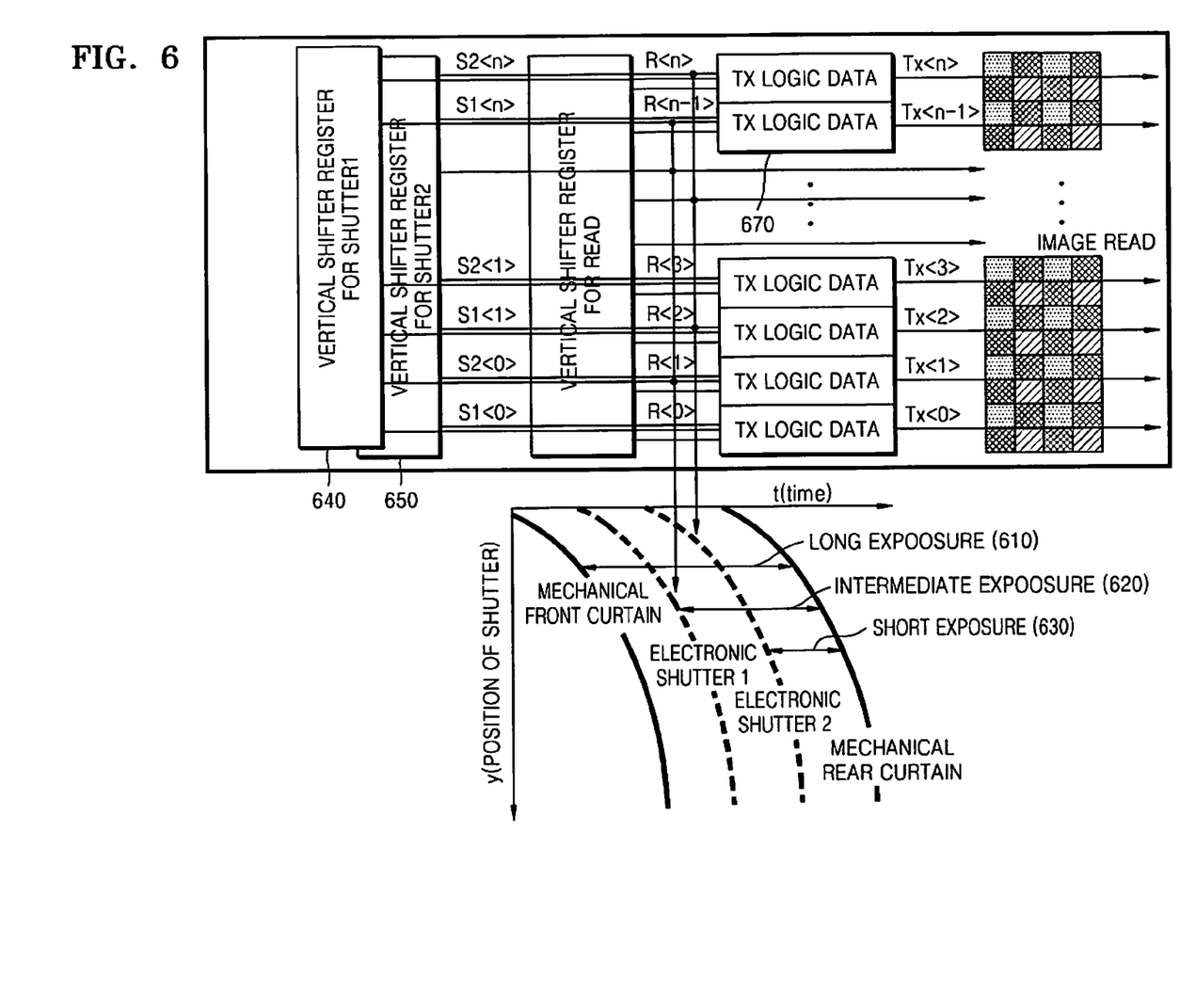
FIG. 6 is a circuit diagram of a configuration for increasing a dynamic range of an image by using two electronic shutters, according to another embodiment of the present invention, and a graph illustrating operations of the two electronic shutters.

FIG. 6 is a circuit diagram of a configuration for increasing a dynamic range of an image by using two electronic shutters, according to another embodiment of the present invention, and a graph illustrating operations of the two electronic shutters.

Figure 7:
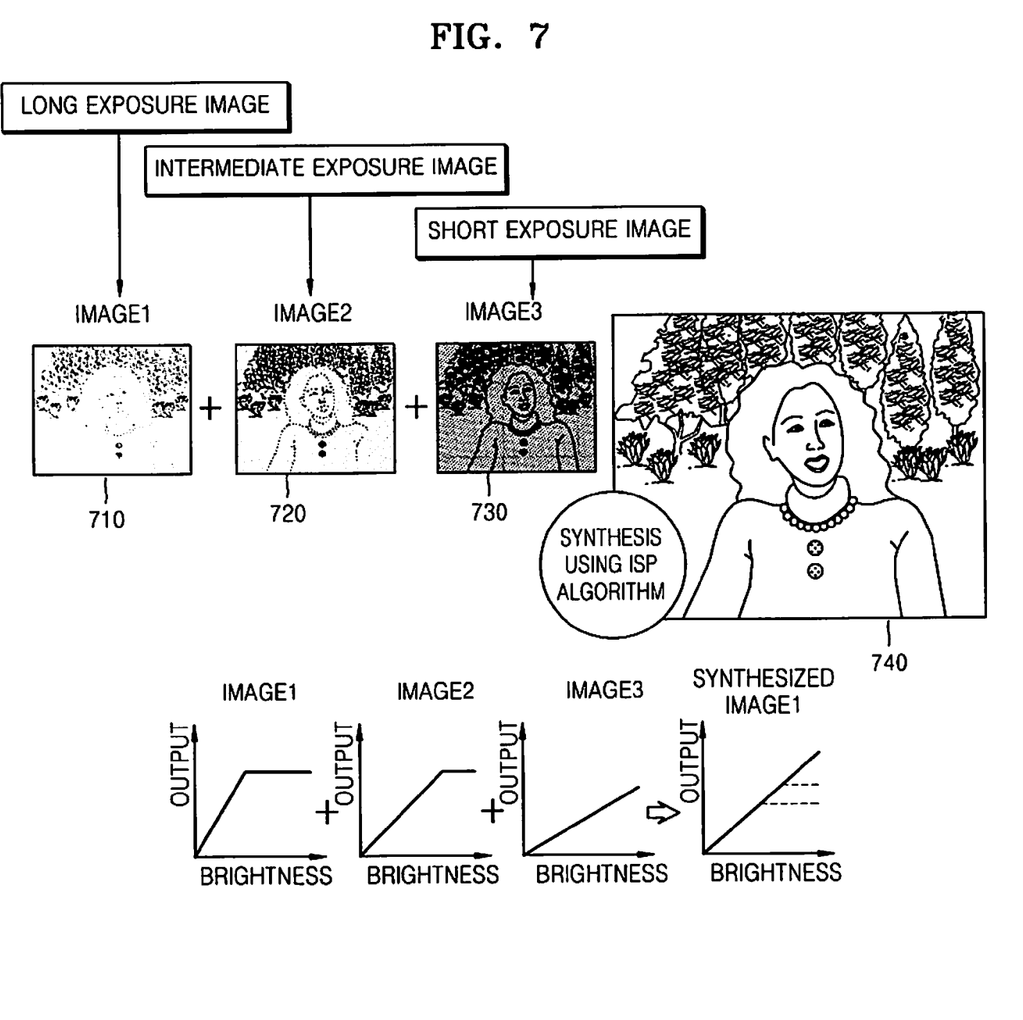
FIG. 7 illustrates a process of generating an HDR image by synthesizing a long exposure image, an intermediate exposure image, and a short exposure image by using an ISP algorithm, according to another embodiment of the present invention.

FIG. 7 illustrates a process of generating an HDR image by synthesizing a long exposure image, an intermediate exposure image, and a short exposure image by using an ISP algorithm, according to another embodiment of the present invention.

If a vertical shift register is added to a control circuit portion of an image sensor, a plurality of images with different exposure amounts may be obtained. As the number of images with different exposure amounts increases, the possibility of generating a desired HDR image increases.

Accordingly, referring to FIG. 6, the configuration additionally includes a vertical shift register for shutter 1 640 and a vertical shift register for shutter 2 650 for generating a control pulse signal by using an electronic shutter 1 and an electronic shutter 2. The electronic shutter 1 and the electronic shutter 2 acquire an intermediate exposure image and a short exposure image, respectively.

The vertical shift register for shutter 1 640 and the vertical shift register for shutter 2 650 output a control pulse signal to a logic gate 670.

Accordingly, a plurality of exposure images including a long exposure image 610 starting from a mechanical front curtain, an intermediate exposure image 620 starting from the electronic shutter 1, and a short exposure image 630 starting from the electronic shutter 2 may be simultaneously acquired even with only one shutter operation.

However, if an image is extracted in units of three lines, there may be a possibility that a shading error occurs due to a specific pattern or the like. In order to solve this problem, exposure control may be performed in a zigzag pattern in units of pixels.

That is, there are two signals for controlling pixels in one line. The two signals are located so as to perform exposure control in a zigzag pattern. Accordingly, long exposure and short exposure images may be acquired in an odd or even zigzag pattern in one line by using an electronic shutter. The images acquired in the zigzag pattern may be effectively synthesized without a shading error due to a specific pattern.

Referring to FIG. 7, an HDR image 740 may be generated by synthesizing a long exposure image 710, an intermediate exposure image 720, and a short exposure image 730, which are acquired with only one shutter operation, by using an ISP algorithm.

Figure 8:
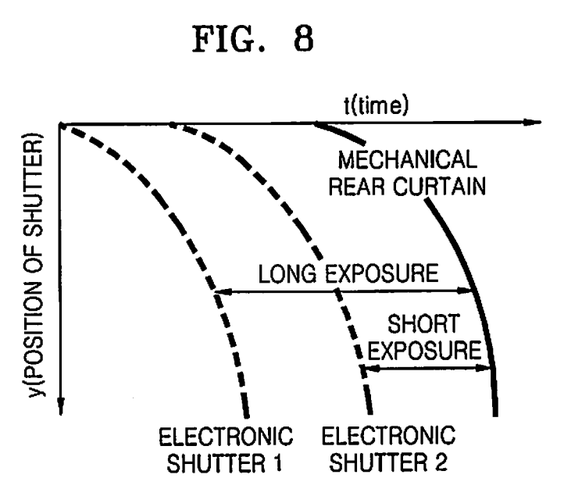
FIG. 8 is a graph illustrating an operation for acquiring a long exposure image and a short exposure image by using two electronic shutters and a mechanical rear curtain instead of a mechanical front curtain, according to another embodiment of the present invention.

FIG. 8 is a graph illustrating an operation for acquiring a long exposure image and a short exposure image by using two electronic shutters and a mechanical rear curtain instead of a mechanical front curtain, according to another embodiment of the present invention.

Referring to FIG. 8, since the electronic shutters are used instead of the mechanical front curtain, a time taken to operate the mechanical front curtain may be reduced. Since only the mechanical rear curtain is operated, a structure of a mechanical shutter of a camera may be simplified and the size of the camera may be reduced.

Since the mechanical front curtain is replaced with the electronic shutter 1, an HDR image may be acquired by acquiring a long exposure image and a short exposure image during a fast shutter operation and synthesizing the long exposure image and the short exposure image.

FIG. 9 is a block diagram of an apparatus 900 for increasing a dynamic range of an image by using an electronic shutter of a camera, according to an embodiment of the present invention.

Referring to FIG. 9, the apparatus 900 includes a mechanical front curtain moving unit 910, the electronic front curtain moving unit 920, a mechanical rear curtain moving unit 930, scan pattern generating unit 940, the multi-exposure pulse signal generating unit 950, a multi-exposure image acquiring unit 960, and an image synthesizing unit 970.

The mechanical front curtain moving unit 910 initiates exposure of an image sensor by moving a mechanical front curtain included in the camera.

The electronic front curtain moving unit 920 moves an electronic front curtain at least one time with respect to at least one pixel of the image sensor according to a control pulse signal of the electronic shutter generated by the multi-exposure pulse signal generating unit 950.

The mechanical rear curtain moving unit 930 blocks the exposure of the image sensor by moving a mechanical rear curtain included in the camera.

The scan pattern generating unit 940 generates a scan pattern based on parameters that are external factors including at least one of a position, a temperature, and a humidity of the camera.

A conventional electronic shutter having a speed profile that is a linear function performs exposure control on all images for the same exposure time. However, if the conventional electronic shutter is used along with a mechanical front curtain and a mechanical rear curtain to perform exposure control, exposure control may be performed on all images for the same exposure time only when the speed profile of the conventional electronic shutter is nonlinear like speed profiles of the mechanical front curtain and the mechanical rear curtain which are quadratic functions. To this end, the scan pattern generating unit 940 generates a scan pattern for controlling a pixel exposure time with the same speed profile by detecting and extracting profiles of the mechanical front curtain and the mechanical rear curtain.

The multi-exposure pulse signal generating unit 950 generates a control pulse signal of the electronic shutter, so that a line-based or pixel-based exposure initiating time of the image sensor is set to be different from an exposure initiating time due to the mechanical front curtain, according to the scan pattern generated by the scan pattern generating unit 940. That is, the control pulse signal of the electronic shutter is determined as the scan pattern generated by the scan pattern generating unit 940.

The multi-exposure pulse signal generating unit 950 may include a linear line control unit 951 for applying a control pulse signal to odd or even lines of the image sensor, and a zigzag control unit 952 for applying a control pulse signal to odd or even pixels of the image sensor.

The multi-exposure signal generating unit 950 generates a control signal for obtaining images with different exposure amounts by freely controlling an exposure time as long as the exposure time is less than an exposure time of a long exposure image which has the longest exposure from among the images.

The multi-exposure image acquiring unit 960 acquires a long exposure image by using the mechanical front curtain and a short exposure image by using the electronic front curtain after the exposure of the image sensor is blocked by the mechanical rear curtain.

The image synthesizing unit 970 generates an HDR image with an increased dynamic range by synthesizing the long exposure image and the short exposure image.

The method of increasing the dynamic range of an image according to the embodiments of the present invention improves the function of an electronic shutter by additionally using a vertical shift register, acquires long and short exposure images by simply changing the structure of the image sensor, acquires an HDR image by synthesizing and correcting the long and short exposure images, and prevents an error from occurring due to hand shake of the user during a fast shutter operation.

Furthermore, the method for increasing the dynamic range of the image according to the embodiments of the present invention may perform a bracketing function to acquire three images with different exposure amounts. Image loss due to a shading error that may occur in an image projected at a boundary line of the image sensor may be prevented, and an error due to a repeated pattern or a specific pattern may be prevented, by controlling the amount of exposure of the image sensor in units of lines or pixels.

Moreover, the structure of a mechanical shutter may be simplified by enabling the electronic shutter to perform the operation of a mechanical front curtain, a time taken to operate the mechanical front curtain may be reduced, images with different exposure amounts may be acquired at high shutter speed, and high quality HDR images may be obtained.

The method of increasing the dynamic range of the image may be written as computer programs and may be implemented in general-purpose digital computers that execute the programs using a computer-readable recording medium.

Also, as described above, data used in the present invention may be written by using various methods to the computer-readable recording medium.

Examples of the computer-readable recording medium include storage media such as magnetic storage media (e.g., read only memories (ROMs), floppy discs, or hard disks), and optical reading media (e.g., compact disk-read only memories (CD-ROMs) or digital versatile disks (DVDs)).

While the present invention has been particularly shown and described with reference to exemplary embodiments thereof using specific terms, the embodiments and terms have been used to explain the present invention and should not be construed as limiting the scope of the present invention defined by the claims. The preferred embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method for increasing a dynamic range of an image by using an electronic shutter of a camera, the method comprising:
    initiating exposure of an image sensor by moving a mechanical front curtain included in the camera;
    moving an electronic front curtain with respect to at least one pixel of the image sensor according to a control pulse signal of the electronic shutter;
    blocking the exposure of the image sensor by moving a mechanical rear curtain included in the camera: and
    acquiring, after blocking the exposure, a long exposure image using the mechanical front curtain and a short exposure image using the electronic front curtain.

2. The method of claim 1, wherein the electronic front curtain is moved nonlinearly in accordance with speed and travel characteristics of the mechanical front curtain and the mechanical rear curtain.

3. The method of claim 2, further comprising setting a line-based or pixel-based exposure initiating time of the image sensor to be different from an exposure initiating time due to the mechanical front curtain.

4. The method of claim 3, wherein setting the line-based or pixel-based exposure initiating time of the image sensor comprises applying the control pulse signal to odd or even lines of the image sensor, or applying the control pulse signal to odd or even pixels of the image sensor, respectively.

5. The method of claim 4, wherein the control pulse signal of the electronic shutter is generated as a scan pattern of the electronic shutter based on parameters that are external factors including at least one of a position, a temperature, and a humidity of the camera.

6. The method of claim 1, further comprising generating a High Dynamic Range (HDR) image with an increased dynamic range by synthesizing the acquired long exposure image and the acquired short exposure image.

7. The method of claim 1, further comprising moving the electronic front curtain at least one time with respect to at least one pixel of the image sensor according to the control pulse signal of the electronic shutter.

8. The method of claim 1, wherein initiating the exposure of the image sensor included in the camera is performed by using the electronic shutter of the camera.

9. An apparatus for increasing a dynamic range of an image by using an electronic shutter of a camera, the apparatus comprising:
    a mechanical front curtain moving unit configured to initiate exposure of an image sensor by moving a mechanical front curtain included in the camera;
    an electronic front curtain moving unit configured to move an electronic front curtain with respect to at least one pixel of the image sensor according to a control pulse signal of the electronic shutter;
    a mechanical rear curtain moving unit configured to block the exposure of the image sensor by moving a mechanical rear curtain included in the camera; and
    a multi-exposure image acquiring unit configured to acquire, after the exposure of the image sensor is blocked, a long exposure image using the mechanical front curtain and a short exposure image using the electronic front curtain.

10. The apparatus of claim 9, wherein the electronic front curtain is moved nonlinearly in accordance with speed and travel characteristics of the mechanical front curtain and the mechanical rear curtain.

11. The apparatus of claim 9, further comprising a multi-exposure pulse signal generating unit configured to generate the control pulse signal so that a line-based or pixel-based exposure initiating time of the image sensor is set to be different from an exposure initiating time due to the mechanical front curtain.

12. The apparatus of claim 11, wherein the multi-exposure pulse signal generating unit comprises a linear-line control unit for applying the control pulse signal to odd or even lines of the image sensor and a zigzag control unit for applying the control pulse signal to odd or even pixels of the image sensor.

13. The apparatus of claim 9, further comprising a scan pattern generating unit configured to generate a scan pattern of the electronic shutter based on parameters, which are external factors including at least one of a position, a temperature, and a humidity of the camera, in order to generate the control pulse signal.

14. The apparatus of claim 9, further comprising an image synthesizing unit configured to generate an HDR image with an increased dynamic range by synthesizing the acquired long exposure image and the acquired short exposure image.

15. The apparatus of claim 9, wherein the electronic front curtain moving unit moves the electronic front curtain at least one time with respect to at least one pixel of the image sensor according to the control pulse signal of the electronic shutter.

16. A computer-readable recording medium having embodied thereon a program for executing a method for increasing a dynamic range of an image by using an electronic shutter of a camera, comprising:
    a first code segment for initiating exposure of an image sensor by moving a mechanical front curtain included in the camera;
    a second code segment for moving an electronic front curtain with respect to at least one pixel of the image sensor according to a control pulse signal of the electronic shutter;
    a third code segment for blocking the exposure of the image sensor by moving a mechanical rear curtain included in the camera; and a fourth code segment for acquiring, after blocking the exposure, a long exposure image using the mechanical front curtain and a short exposure image using the electronic front curtain.

17. The method of claim 1, further comprising:
acquiring, between the long exposure and the short exposure, an intermediate exposure image using a further electronic front curtain.

18. The method of claim 17, further comprising:
generating a High Dynamic Range (HDR) image with an increased dynamic range by synthesizing the acquired long exposure image, intermediate exposure image, and short exposure image.

19. The apparatus of claim 9, wherein the multi-exposure image acquiring unit is further configured to acquire, after the long exposure and before the short exposure image, an intermediate exposure image using a further electronic front curtain.

20. The apparatus of claim 19, further comprising:
an image synthesizing unit configured to generate an HDR image with an increased dynamic range by synthesizing the acquired long exposure image, intermediate exposure image, and short exposure image.

* * * * *